United States Patent

[11] 3,576,074

[72] Inventors Sidney D. Gault
810 D Skokie Hwy, Wilmette, Ill. 60091;
Gerald M. Silverman, 4250 Marine Drive, Chicago, Ill. 60613
[21] Appl. No. 744,739
[22] Filed July 15, 1968
[45] Patented Apr. 27, 1971

[54] DENTAL ENDOSSEOUS ROOT IMPLANT
1 Claim, 11 Drawing Figs.
[52] U.S. Cl. ................................................ 32/10
[51] Int. Cl. ................................................ A61c 13/00
[50] Field of Search .................................... 32/10, 13, 40, 8

[56] References Cited
UNITED STATES PATENTS
943,113 12/1909 Greenfield.................... 32/8
2,857,670 10/1958 Kiernan, Jr. .................. 32/10

*Primary Examiner*—Robert Peshock
*Attorney*—W. Lee Helms, Esq.

ABSTRACT: The invention relates to a dental endosseous root implant with a first part to be completely embedded in and covered over in a tooth socket and a second part carrying a crown or other prosthetic device. The first part has a root portion or dowel-receiving socket on a crown base or platform with an integral surrounding tapered latticed body freely fitting in the tooth socket or prepared bone socket through which bone tissue may grow to embed and secure the dowel-receiving socket in the alveolar process. The second part has a dowel fitting the socket and carries a crown or the like. The implant technique involves selection of a properly sized root implant or dowel-receiving socket to fit freely but snugly into the tooth socket anytime after extraction of the tooth being especially applicable immediately after extraction of the tooth. The gingival tissue over the root implant is then approximated and sutured together. A blood clot fills the socket around the endosseous root implant and is gradually replaced by a fibrous meshwork. The final stage of healing results in continued deposition of bone around and through the latticed body. During the entire period of healing the root implant is under no occlusal or biting stress nor disturbed by the bacterial flora or oral debris since it was completely embedded in the socket and covered over by oral mucosal tissue. The bone tissue embeds the device and the sealed socket is then exposed only at the top of the root implant whereupon the second or more parts including a dowel crown is firmly attached to the root implant.

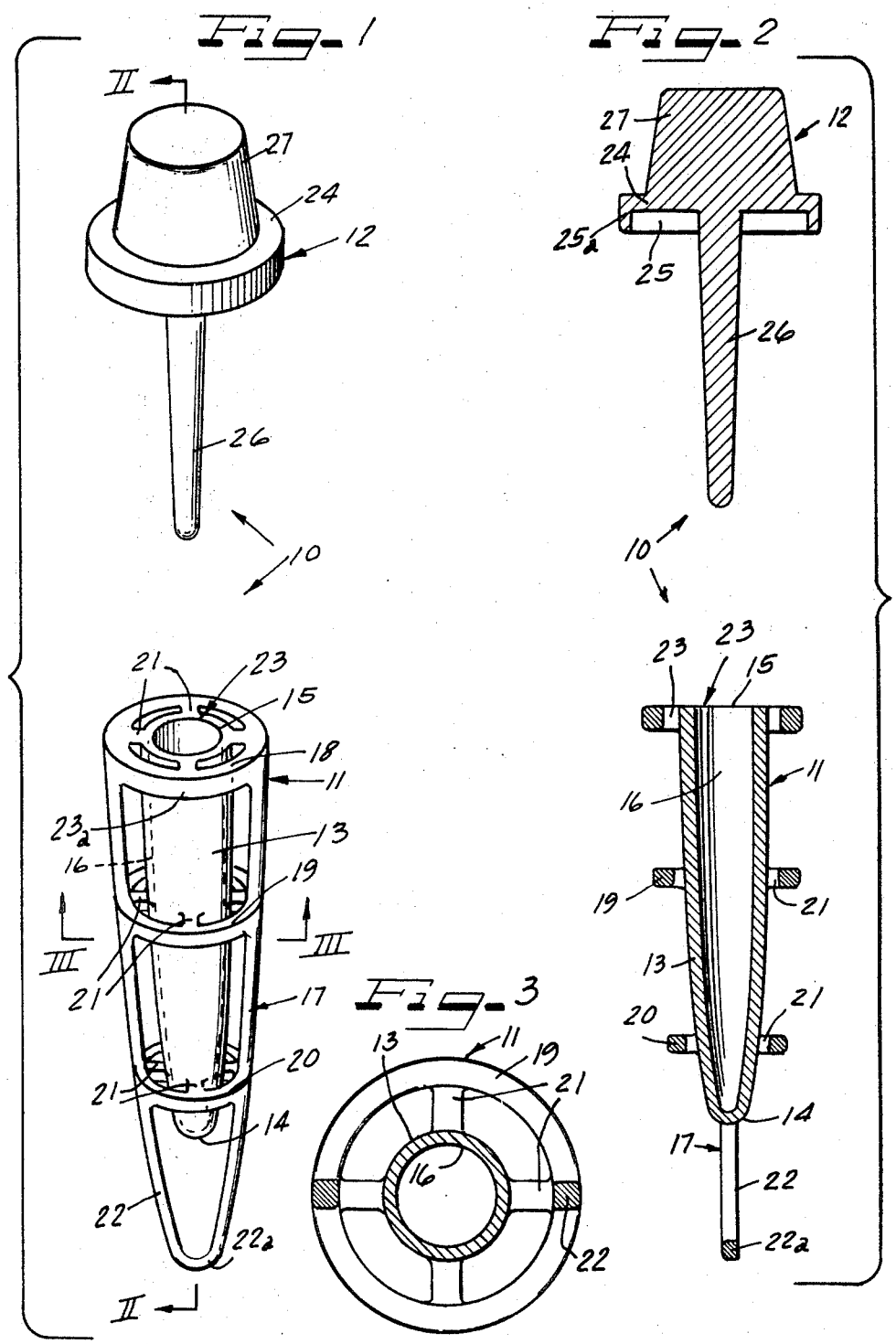

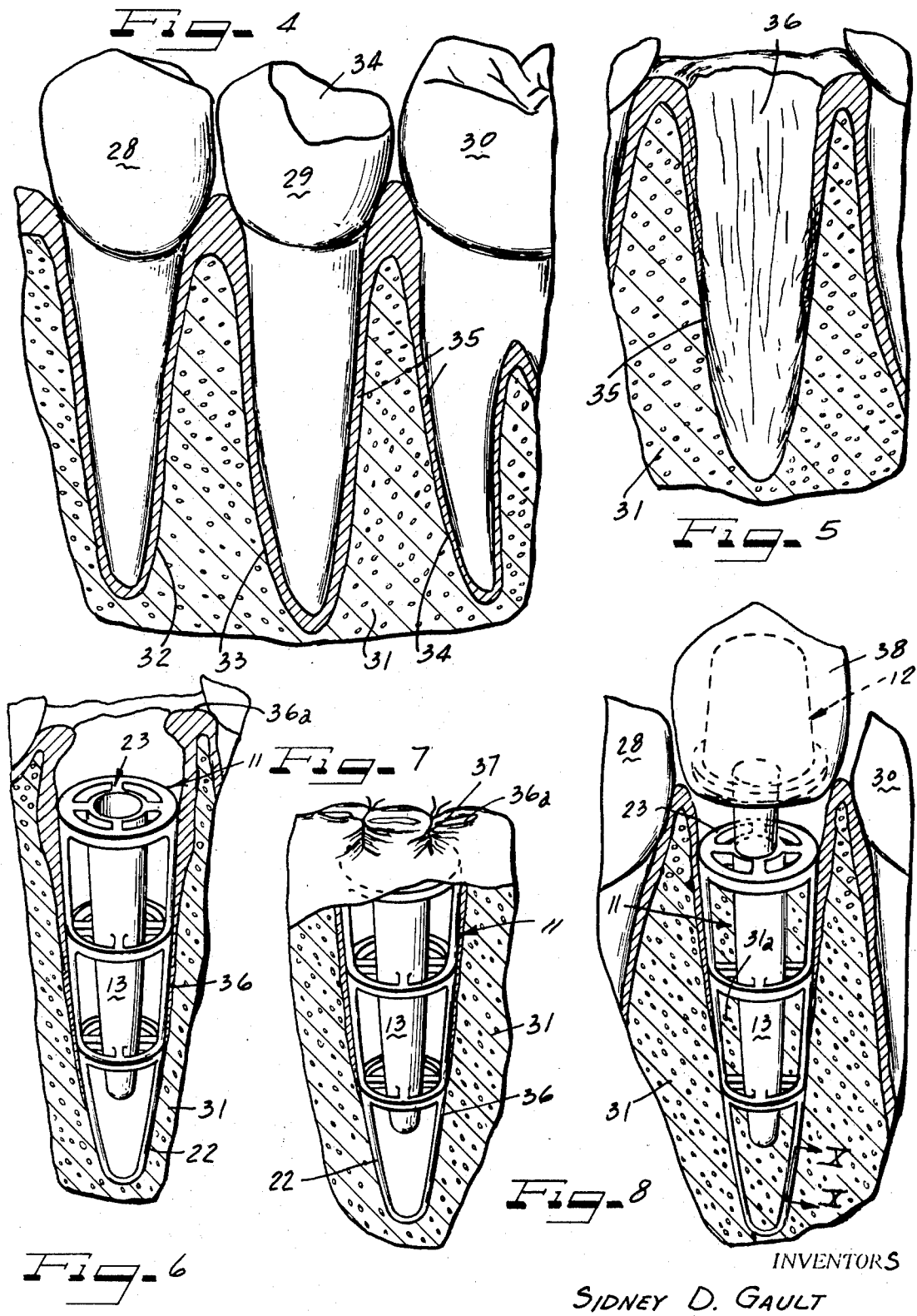

INVENTORS
SIDNEY D. GAULT
GERALD M. SILVERMAN
ATTORNEYS

DENTAL ENDOSSEOUS ROOT IMPLANT

FIELD OF THE INVENTION

This invention relates to a dental endosseous root implant consisting of a root portion or dowel-receiving socket completely embedded within bone tissue for 6—8 weeks or until roentgenographic evidence of bone formation and then exposed occlusally to receive dowel-pin crown or other dental prosthetic device.

PRIOR ART

Heretofore known dental implant devices have involved the presence of occlusal or biting stress on the implant during the early stages of bone formation thus delaying and even preventing formation of a bone anchor for the implant. When an occlusal or biting force was applied to an implant, there was tendency toward displacement of the root portion into the alveolar base or rotation or tilting of the implant resulting in bone destruction, therefore diminishing the possibilities of firm and lasting attachment of the bone to the implant. Generally, much skill and experience was required by the operator, the patient was involved in long dental procedures, the implant frequently had to ligated or splinted to adjacent teeth and often required the cutting of the bone to shape the socket or forcibly threading an implant screw into the bone resulting in trauma of the alveolar process.

SUMMARY

According to this invention, there is provided a two or more part dental implant with a root portion or dowel-receiving socket deposited in the tooth socket anytime after extraction of the tooth being especially applicable immediately after extraction of the tooth and sized to freely but snugly fit in the socket. The second part carries the crown or other dental prosthetic device and is affixed to the first part only after the first part has become embedded in the tooth socket by adequate fiber or bone deposition. The two parts are composed of relatively inert materials such as metals which are electropassive particularly "Vitallium," tantalum, 18—8 SMO steel and titanium or any other suitable metal or synthetic resins such as methyl methacrylate, polyethylene, polyvinyl alcohol (Ivalon), polytetrafluoroethylene (Teflon), and plastic-ceramics or any other suitable synthetic resin. In some cases, it may be desirable to coat the root portion with a porous material such as a ceramic-plastic, plastic epoxy resin or any other suitable material which allows fibrous connective tissue, dense collagen fibers and perhaps bone to invade the open pore structure analogous to the periodontal membrane attachment of teeth to bone.

The preferred first part or root implant unit of this invention is composed of a central elongated open-topped, closed-bottom tube in the center of an open cage or basket composed of a plurality of rings spaced along the length of the tube and decreasing in diameter from the open top to the closed bottom of the tube. These rings are supported from the tube on radially extending struts. A U-shaped bight extends from the top ring and under the bottom of the tube with its side legs secured to the rings and its bight portion spaced beyond the closed bottom of the tube. The top ring and struts are flush with the open top of the tube and provide a platform adopted to be exposed in the tooth socket for receiving the crown base or any other dental prosthetic device of the second part. This second part has a base mating with the platform of the first part or any other form of attachment and a depending dowel pin fitting the tube. The second part also has a dental prepared crown on the base over which the anatomical crown or any other dental prosthetic device is fitted. The anatomical crown is firmly attached, preferably cemented or mechanically attached to the dental prepared crown and the pin or dowel and crown base are firmly attached to the first part, the root implant. The open cage or basket of the first part thus surrounds the tube or dowel-pin socket in spaced concentric relation and provides an open lattice work through which bone tissue will readily grow so that the bight of the cage will be firmly embedded in bone. The lattice forming the cage allows the blood clot to fill the socket around the endosseous root implant resulting in a fibrous meshwork and finally deposition of bone. The shape and size of the cage may be varied as desired to fit the particular tooth socket. The implant unit can be furnished in kits containing a wide selection of shapes and sizes so that the dentist will have a free choice of selecting the implant part most suitable for the socket involved. This socket is preferably the natural tooth socket immediately following extraction of the tooth, but a prepared bone socket is also applicable.

The root implant part is preferably cast, molded or produced in one piece and while the invention will hereinafter be specifically described as embodied in an implant for a single rooted tooth, it is to be understood that the implant part can be furnished as a multirooted device, connected by a strut or other bridge for insertion into the socket of a multirooted tooth. The multirooted implant parts will then provide platforms on which the crown base or any other dental prosthetic device will rest and this crown base can have a plurality of dowel pins inserted into the pin sockets of the implant parts.

If desired, a cushioning of the crown base or any other dental prosthetic device on the root implant can be provided by interposing a resilient material, spring, air cushion or any other suitable device between the base and the top of the implant and/or between the base of the tube socket and apex or end of the dowel pin.

The principle object of the invention is to provide a simple firm endosseous root implant device for attaching crowns, copings, bridgework, full and partial dentures and any other dental prosthetic device.

Another object of this invention is to provide a dental implant with an integral surrounding tapered latticed body freely fitting in the tooth socket or prepared bone socket through which bone tissue may grow, embed and secure the root implant in the alveolar process.

Another object of this invention is to provide an endosseous implant which is under no occlusal or biting stress nor disturbed by the bacterial flora or oral debris during bone deposition and immobilization.

An important object of this invention is to provide a dental implant having a central dowel-pin receiving socket or root implant surrounded by an open latticed body adapted to be freely but snugly sealed in a tooth socket anytime after extraction of the tooth, being especially applicable immediately after extraction of the tooth therefrom to receive bone tissue therethrough and therearound to provide a fixed anchor in the tooth socket together with a second part carrying a crown or any other dental prosthetic device and a dependent dowel pin fitting the dowel-pin socket for fixed attachment to the root implant.

A specific object of this invention is to provide a dental endosseous implant having a first part with a central elongated closed-bottom, open-topped tube surrounded by an open lattice basket connected to the tube through struts together with a second part for carrying a dowel crown or having a dowel crown base or any other dental prosthetic device to be secured to the top of the first part and a dowel pin extending from the base to be secured in the tube of the first part.

Another object of this invention is to provide a device for anchoring crowns in a human mouth which involves depositing a free-fitting root implant in the tooth socket anytime after extraction of a tooth being especially applicable immediately after extraction of the tooth followed by the sealing of the socket as by the use of sutures or any other device closing the wound over the top of the implant until bone tissue substantially filled the tooth socket and firmly embedded the implant.

Another object of this invention is to provide a two-part crown anchor, including an implant part with a pin-receiving socket and a crown base part with a pin fitting the socket.

Other and further objects of this invention will become apparent to those skilled in this art from the following detailed description of the annexed sheets of drawings which, by way of preferred examples only, illustrate several embodiments of the invention.

BRIEF DESCRIPTION OF THE DRAWINGS

FIG. 1 is a generally perspective view of the two components of the crown anchor according to this invention.

FIG. 2 is a longitudinal cross-sectional view along the line II–II of FIG. 1.

FIG. 3 is a transverse cross-sectional view along the line III–III of FIG. 1.

FIG. 4 is a somewhat schematic view of several teeth and teeth sockets in a human jaw illustrating a tooth to be extracted.

FIG. 5 is a view similar to FIG. 4 but illustrating the extraction site or tooth socket after the extraction.

FIG. 6 is a view similar to FIG. 5 but illustrating the implant device of this invention inserted in the extraction site or empty tooth socket of FIG. 5.

FIG. 7 is a view similar to FIG. 6 but illustrating the closing of the tooth socket for the healing process.

FIG. 8 is a view similar to FIG. 7 but illustrating the embedded implant device after completion of the healing process and deposition of bone around implant root and also showing the uncovered top of the implant receiving the dowel crown and anatomical crown.

DESCRIPTION OF THE PREFERRED EMBODIMENTS

Figure 9:
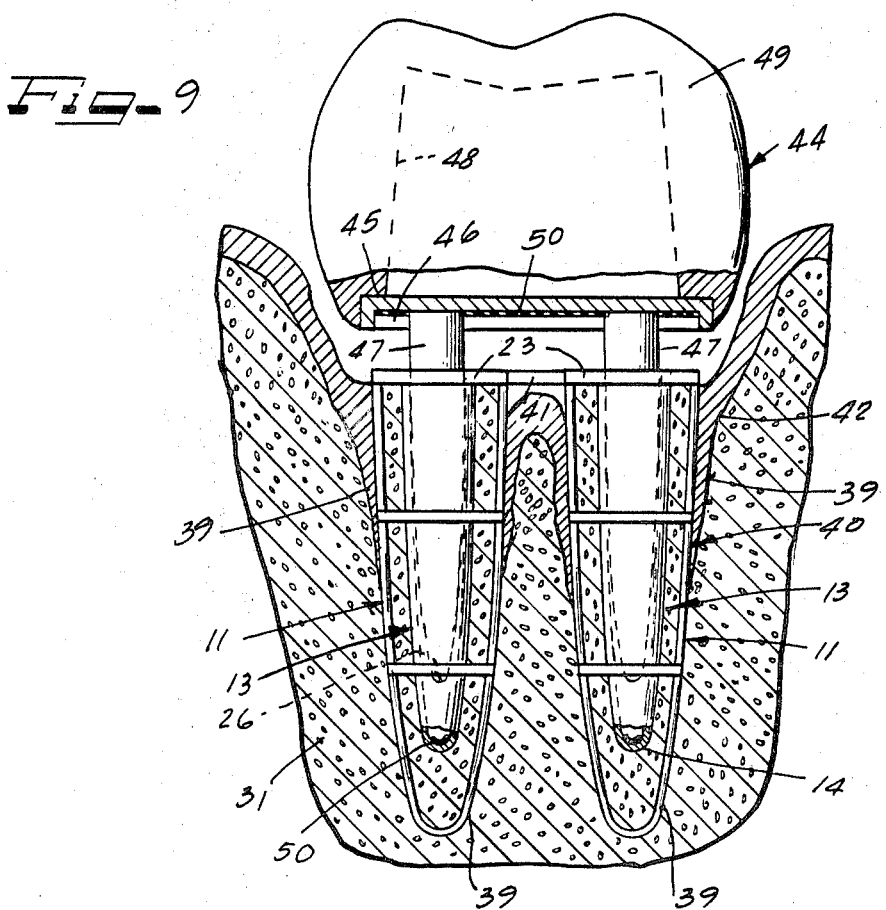
FIG. 9 is a somewhat schematic view illustrating a multirooted implant device according to this invention positioned in a multirooted tooth socket.

The dowel-crown-root endosseous implant 10 of this invention, as illustrated in FIGS. 1 and 2, includes a root implant component 11 and a crown carrier component 12. The root implant component 11 is unitary and is composed of a central elongated tube 13 with a closed bottom 14 and an open top 15. The tube is preferably tapered and provides a tapered pin socket 16. The tube 13 is surrounded by a cage or basket 17 composed of three axially spaced rings 18, 19 and 20 decreasing in diameter and joined to the tube 13 by radial struts or ribs 21, four equally spaced struts 21 being illustrated for each ring. A longitudinally extending U-shaped strut 22 envelopes the three rings 18, 19 and 20 and is integrally affixed to the peripheries of these rings. The bight portion 22a of this strut 22 is spaced below the closed end 14 of the tube 13. Since the rings 18, 19 and 20 are of decreasing diameter, the U-shaped strut 22 converges from the top ring 18 to the bight 22a and a tapered contour is thereby provided for the component 11.

The top ring 18 cooperates with the radial struts 21 and the rim of the open-topped tube 13 to provide a flat top platform 23 for the component 11. The top platform 23 is surrounded by a cylindrical wall 23a afforded by the periphery of the top ring 18.

The component 12 has a circular crown base 24 with a recessed bottom 25 surrounded by a cylindrical peripheral skirt or shoulder 25a. A tapered pin or dowel 26 depends from the central portion of the crown base 24 and a prepared crown 27 extends upwardly from the top of the base 24. The recess 25 is adapted to receive the top platform 23 therein with the skirt 25a snugly embracing the cylindrical wall 23a of the unit 11. The pin 26 fits the socket 16 of the central tube 13 and as hereinafter more fully explained, the base 24 is cemented or mechanically attached to the platform 23 and the pin 26 is cemented or mechanically attached in the socket 16.

As shown in FIG. 3, there is considerable space or gap between the tube 13 and the surrounding rings such as 19 and struts 22. The unit 11 thus has an open latticelike cage surrounding the central tube 13.

As shown in FIG. 4, three teeth 28, 29 and 30 are illustrated with their roots extending into sockets provided by the boney tissue of the alveolar process 31 of a human jaw. The tooth sockets illustrated at 32, 33 and 34 are lined with a periodontal membrane 35 and the roots of the teeth are connected by fibers through this membrane to the alveolar process. The center tooth 29 is illustrated as very carious at 34 indicating that the tooth is beyond repair and indicated for extraction.

Upon removal of the tooth 29, as illustrated in FIG. 5, there remains an extraction site or socket 36 with a closed bottom and an open top and with remnants of the periodontal membrane 35 remaining in the empty socket, portions of the membrane adhering to the extracted tooth and other portions adhering to the alveolar process 31.

In accordance with this invention and as shown in FIG. 6, the extraction site or hollow socket 36 receives the implant unit 11 anytime after extraction of tooth 29, being especially applicable immediately after extraction of the tooth 29. An implant unit 11 of proper size is selected to freely but snugly fit the socket 36 without requiring drilling of the bone for the preferable immediate implant or water-cool bur preparation of the bone for the delayed implant so that implanting of the unit will not create unnecessary trauma. It will be understood, however, that the selected implant unit 11 will be so dimensioned and shaped as to closely approximate the tooth socket thereby avoiding appreciable socket preparation. In other words, the implant 11 is selected to fit the unaltered socket freely but snugly wherever possible to eliminate trauma. As shown, the top platform 23 is somewhat depressed under the opening 36a of the socket so that surrounding gingival tissue may be drawn over the platform as illustrated in FIG. 7, wherein sutures 37 close the top of the extraction site or wound to completely incase the unit 11 within the socket 36.

After unit 11 is implanted and the top of the extraction site or wound is sutured incasing the unit 11 within the socket 36, a blood clot fills the socket 36 around the endosseous root implant and finally deposition of bone completely embeds and interlocks the unit 11 as shown in FIG. 8. As therein shown, the bone 31a is continuous with the surrounding bone 31 and is integral therewith.

During a period of about 6—8 weeks or until roentgenographic evidence of bone formation, the root implant unit 11 is under no occlusal or biting stress nor disturbed by the bacterial flora or oral debris since unit 11 is completely embedded in the socket and completely covered over by oral mucosal tissue. Therefore, during the entire healing process, the implant is not exposed to the harmful influences of the external environment.

Upon roentgenographic evidence of sufficient bone growth to provide the fixed anchor for the implant in the tooth socket, the top of the socket is opened up to expose the platform 23 as illustrated in FIG. 8 and the prepared dowel-crown unit 12 is mounted on the platform 23 with the crown base being temporarily cemented or mechanically attached to the platform 23 and with the dowel pin 26 being temporarily cemented or mechanically attached in the tube 13. Thus, for the first time unit 11 is exposed and subject to the external occlusal or biting stress, bacterial flora and oral debris only after deposition of bone resulting in an establishment of an immobilized anchor for unit 12.

Component 12 may be tested in the oral cavity in its proper position in unit 11 for a few days, after which an impression of the component 12 as it relates to the adjacent and opposing teeth may be taken. Models of the upper and lower teeth are made from the impression and sent to the laboratory for production of the anatomical crown or any other dental prosthetic device 38 to fit prepared crown 27 on component 12. Final finishing and polishing of anatomical crown 38 on prepared crown 27 can be done out of the patient's mouth thus saving patient-chair time, eliminating trauma, and enabling the dentist to improve the fit of the crown. Since the prepared crown 27 may be produced in identical measurements for most teeth, the anatomical crown 38 may be standardized in size and production by the dental laboratories.

As illustrated in FIG. 9, if the natural tooth socket has a multirooted socket 39 as when a molar tooth such as 30, is extracted, a multiple implant device 40 may be used composed of two units 11 having their top platforms connected by a bridge 41 spanning the socket opening 42 between the two root sockets 39. The bridge connection 41 is rigid, but can be bent under force so that the units 11 will extend at the proper angles into the root sockets 39. This multirooted device is particularly applicable to upper or maxillary molar teeth immediately after extraction of the tooth whereas an enlarged version of the previously described single-rooted tooth implant may be used for lower or mandibular molar teeth, after removal of interradicular bone, either for the immediate or delayed implant or for the maxillary molar delayed implant.

A crown unit 44 for the multirooted implant assembly 40 is provided with a crown base 45 having a recess 46 large enough to receive both top platforms 23 of the units 11. The crown base 45 has dowel pins 47 depending therefrom into the tubes 13 of the units 11 and has a single prepared crown 48 receiving the anatomical crown 49 or any other dental prosthetic device. If desired, a cushion 50, produced by interposing a resilient material, spring, air cushion or any other suitable device can be interposed between the platforms 23 and the crown base 45 and/or between closed bottom of tube 13 and apex or end of dowel pins 47. A similar cushion, of course, could be used for the single socket implant.

Figures 10, 11:
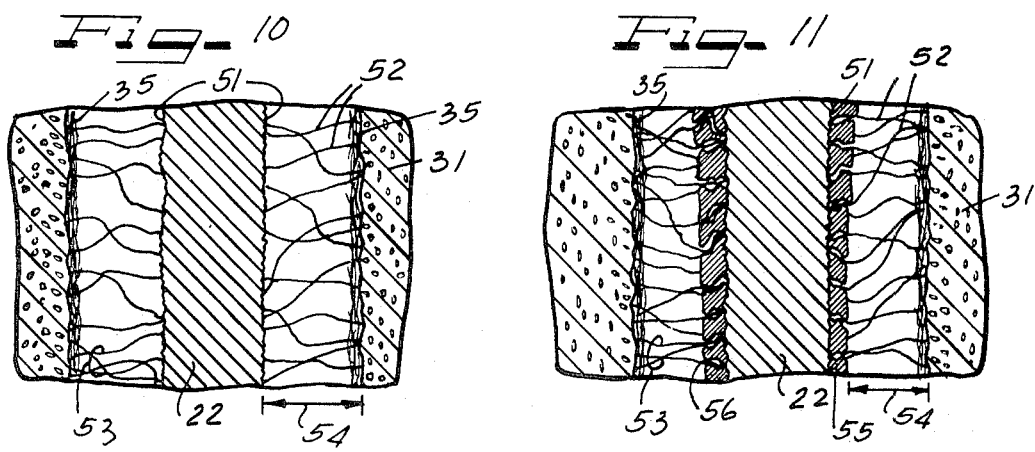
FIG. 10 is a greatly enlarged section taken along the line X–X of FIG. 8 illustrating the fibrous connective tissue, dense collagen fibers or perhaps bone fibers approximating the implant device in the alveolar process of the jaw bone.
FIG. 11 is a view similar to FIG. 10 but illustrating the fibrous connective tissue, dense collagen fibers or perhaps bone fibers invading the open pore structure of a porous coating around the root portion.

As illustrated in the greatly enlarged fragmentary view of FIG. 10 the implant device 11 has the strut 22 provided with usually a roughened surface 51. This is illustrative of the entire cage surfaces including the rings and also the external surface of the tube 13.

The alveolar process 31 forming the socket in which the implant device 11 is placed has remnants of the periodontal membrane 35 which contains pluripotential cells capable of producing osteoblasts and fibroblasts. These osteoblasts and fibroblasts produce fibers 52 which approximate the roughened surface 51 of the implant strut 22 thus forming a fibrous meshwork 53 in the periodontal membrane space 54 which may aid in retention of the implant. The periodontal membrane space 54 averages between 0.2 and 0.5 mm. This fibrous meshwork 53 grows all around the implant device.

As shown in FIG. 11, the strut 22 of the implant device 11 may be coated with a porous material 55. This covering 55 is provided on all surfaces of the cage portion of the implant device 11 as well as on the external surface of the dowel-pin socket 13 of the device. As illustrated in FIG. 11, the fibers 52 described in FIG. 10 invade the interstices or pores 56 of the coating 55 and thereby enhancing the retention of the implant.

From the above description, it will therefore be understood that this invention provides a novel process for establishing the immobilization of a dental implant by incasing the root part within a tooth socket, suturing the socket closed and allowing for deposition of bone around and through the latticed body. Therefore, during the entire healing process, the implant is not exposed to the harmful influences of the external environment. Upon completion of healing, the top of the root part is exposed and a dowel crown as described here or any other dental prosthetic device is attached to the root part. Therefore, this invention embodies a two or more part dental endosseous implant with the root part firmly embedded and immobilized with the bone before placement of the crown or other dental prosthetic device.

Although we have herein set forth our invention embodying certain specific structures, design and principles and details thereof, it will be understood that various modifications and changes in the specific structures and design may be made without departing from the basic principle, spirit and scope of the invention as set forth in the hereunto appended claims.

We claim:

1. A dental crown-anchoring device which includes an implant part having a central tubular dowel socket connected in spaced relation to an open lattice cage adapted to be freely but snugly inserted and imbedded in a tooth extraction site, said cage consisting of a top member centrally apertured in communication with the tubular dowel socket, and two laterally spaced struts forming a loop member having its strut lengths depending from the upper area of said tubular dowel socket, said loop member extending longitudinally of the dowel socket and outwardly spaced therefrom, and spaced connecting and reinforcing means projected inwardly from the strut lengths of said loop member across the space between them and the tubular dowel socket and connecting said strut lengths and said tubular dowel socket.